United States Patent [19]

Dionne

[11] Patent Number: 4,691,891

[45] Date of Patent: Sep. 8, 1987

[54] DEVICE FOR PREVENTING UNAUTHORIZED REMOVAL OF PORTABLE OBJECTS

[76] Inventor: Robert Dionne, 32 Place Gabriel, Candiac, Quebec, Canada, J5R 3Y1

[21] Appl. No.: 780,096

[22] Filed: Sep. 25, 1985

[51] Int. Cl.$^4$ ............................................. F16M 13/00
[52] U.S. Cl. ................................ 248/551; 248/205.3; 248/359
[58] Field of Search ........... 248/551, 552, 553, 359 A, 248/205.3, 205.4

[56] References Cited

U.S. PATENT DOCUMENTS

| | | |
|---|---|---|
| 854,947 | 5/1907 | Hill . |
| 1,085,862 | 2/1914 | Herzberg et al. . |
| 1,498,176 | 6/1924 | Lachman . |
| 2,747,871 | 5/1956 | Brandt et al. . |
| 2,765,057 | 10/1956 | Stiefvater . |
| 2,877,876 | 3/1959 | Musselman . |
| 2,975,874 | 3/1961 | Pagan . |
| 3,029,303 | 4/1962 | Severino . |
| 3,311,338 | 3/1967 | Culley . |
| 3,328,931 | 7/1967 | Smith . |
| 3,616,096 | 10/1971 | Roeder . |
| 3,664,616 | 5/1972 | Raskin . |
| 3,672,190 | 6/1972 | Palazzolo ............................... 70/58 |
| 3,850,392 | 11/1974 | Gassaway ............................ 248/553 |
| 3,908,942 | 9/1975 | Keith et al. ...................... 248/551 X |
| 3,993,278 | 11/1976 | Race .................................... 248/551 |
| 4,031,721 | 6/1977 | Anderson . |
| 4,067,532 | 1/1978 | Viteretto .......................... 248/359 A |
| 4,117,700 | 10/1978 | Saunders . |
| 4,161,834 | 7/1979 | Hendricks ...................... 248/551 X |
| 4,300,692 | 11/1981 | Moreno . |

Primary Examiner—Ramon O. Ramirez
Attorney, Agent, or Firm—Samuel Meerkreebs

[57] ABSTRACT

The invention relates to a device for preventing a portable object from being removed from a support. The device of the invention comprises a pair of members each formed with an attachment base having an adhesive securing surface facing one direction and with at least one connecting arm projecting from the base in an opposite direction, the members being adapted to interconnect the object and the support through the connecting arms with one member having its attachment base adhesively secured to the object and the other member having its attachment base adhesively secured to the support and the connecting arms extending in side-by-side relationship. The device further includes tamper-proof fastening means for coupling together the connecting arms whereby to securely connect the object to the support. Such a device is particularly useful for preventing unauthorized removal of portable equipment, such as micro-computers, video cassette recorders and the like, from their intended or customary position on a support.

10 Claims, 4 Drawing Figures

U.S. Patent  Sep. 8, 1987  4,691,891
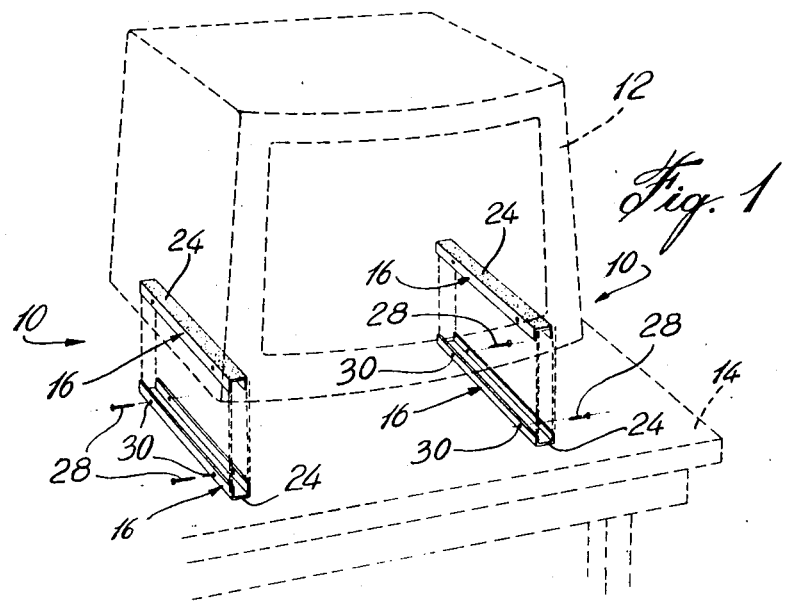
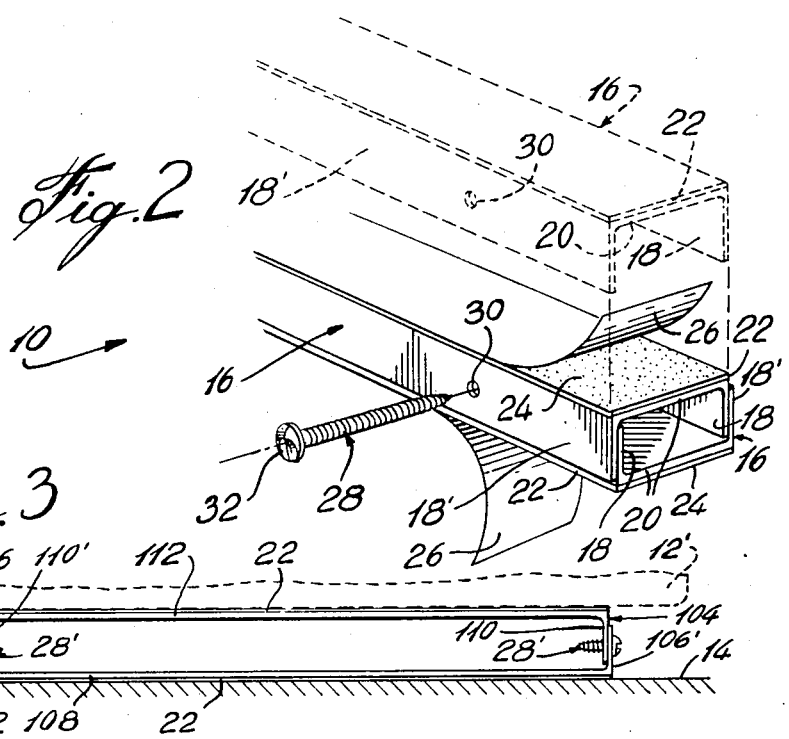
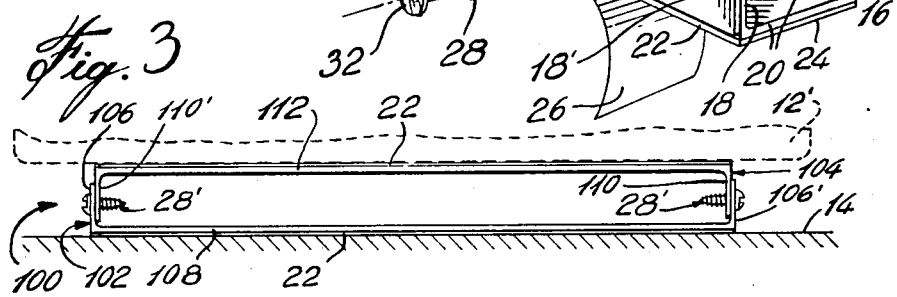
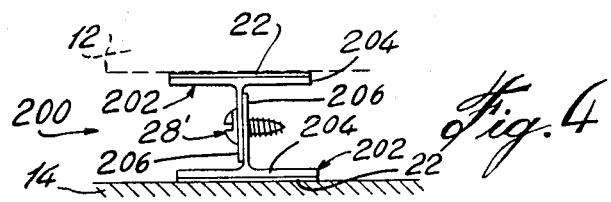

DEVICE FOR PREVENTING UNAUTHORIZED REMOVAL OF PORTABLE OBJECTS

BACKGROUND OF THE INVENTION (a) Field of the Invention

The present invention relates to improvements in anti-theft devices. More particularly, the invention is directed to a device for preventing unauthorized removal of portable equipment, such as micro-computers, video cassette recorders and the like, from their intended or customary position on a support.

Since the advent of micro-computers and video equipment in schools as teaching aids, there has been an increasing incidence of theft of such equipment. Micro-computer monitors, computer bases, keyboards and printers as well as video cassette recorders are very costly pieces of equipment to replace and it has become desirable to securely connect these to a desk or table supporting same.

(b) Description of Prior Art

U.S. Pat. No. 3,672,190 describes an anti-theft device for securely connecting a portable piece of equipment to a desk or the like, comprising a bar attachable by fasteners passing through the bar and through openings in the desk top, and into the base of the piece of equipment for holding the latter in firm engagement with the upper surface of the desk. Access to the attaching bar and fasteners is prevented by a trough-like shield member which encases both the attaching bar and fasteners and is provided with a key-operable lock for securing it in position.

While such an anti-theft device may be effective in preventing removal of a piece of equipment from its support, it necessitates drilling holes into the desk or other support for allowing passage of the fasteners, such as threaded bolts, which engage the base of the piece of equipment and by means of which the latter may be attached to the support via the attaching bar disposed on the bottom surface of the support. If the equipment requires relocation, the support is left damaged with holes. Moreover, not all pieces of equipment are provided with bases which may receive or are adapted to receive threaded bolts or the like for securing to a support.

In the equipment security device proposed in U.S. Pat. No. 3,850,392, the making of holes in a support surface is avoided by providing a flexible pad bondable by adhesive to the support surface, and a cover having depending lugs with holes adapted to register with corresponding loops protruding upward from the pad so that lock pins may be passed through the lugs and loops, from openings through the cover, to attach the cover to the pad. The equipment to be secured is bolted to the top of the cover from inside the cover before the latter is attached to the pad. Access to the bolts holding the equipment is prevented by the provision of key-operable locks which are inserted into the cover openings after the lock pins have been introduced so that the pins cannot be retracted until the locks are unlocked by a key. As in the case of U.S. Pat. No. 3,672,190, the necessity of having key-operable locks significantly adds to the cost of manufacture since the locks require different keys from one security device to another. Precise alignment between the loops on the pad and the lugs depending from the cover is also necessary for proper attachment of the cover to the pad. Moreover, since use is made of a flexible pad, such a security device necessarily needs a complete large flat surface for installation and thus cannot be supported on a frame. The security device of U.S. Pat. No. 3,850,392 also presents a significant obstruction between the piece of equipment and the support surface so that proper ventilation underneath the piece of equipment is inhibited.

SUMMARY OF THE INVENTION

It is therefore an object of this invention to provide a device for preventing unauthorized removal of a portable object from a support, which is of simple and economical construction and is easy to install.

It is a further object of the invention to provide a device as above, which will present minimum surface to facilitate ventilation.

In accordance with the present invention, there is thus provided a device for preventing a portable object from being removed from a support, which device comprises a pair of members each formed with an attachment base having an adhesive securing surface facing one direction and with at least one connecting arm projecting from the base in an opposite direction, the members being adapted to interconnect the object and the support through the connecting arms with one member having its attachment base adhesively secured to the object and the other member having its attachment base adhesively secured to the support and the connecting arms extending in side-by-side relationship. The device of the invention further includes tamper-proof fastening means for coupling together the connecting arms whereby to securely connect the object to the support.

Each member is preferably provided with a cushioned adhesive material defining the adhesive securing surface. The use of a cushioned adhesive material enables to dampen vibrations which may be caused by the piece of equipment itself, e.g. a microcomputer printer, or by the external environment. A peel-off protective tape advantageously covers the adhesive material, the protective tape being peelable to expose the adhesive securing surface for adhesion to the object or the support.

In a preferred embodiment of the invention, each member is elongated and has a U-shaped cross-section with two spaced-apart parallel arms and a planar base interconnecting the arms, the adhesive material extending over substantially the full length of the planar base. Where such members are identical to one another, they may be arranged in their coupled position with each member having a respective arm interposed between the respective arms of another member. The tamper-proof fastening means preferably comprise tamper-proof screws engagable in aligned openings formed in the respective arms of the members.

According to another preferred embodiment, the space defined between the arms of one U-shaped member is larger than the space defined between the arms of the other U-shaped member so that when the members are coupled together one member straddles the other member.

According to a still further preferred embodiment, each member is elongated and has a T-shaped cross-section with a planar base and an arm extending at right angle to the planar base, the adhesive material extending over substantially the full length of the planar base. The tamper-proof fastening means preferably comprise tamper-proof screws engageable in aligned openings formed in the arms of such members, the members when coupled together defining an H-configuration.

The anti-theft device of the invention is useful for securing micro-computer equipment, such as monitors, computer bases, keyboards, printers, modems and terminals, as well as video, audio or other equipment to a support. It may also be used for securing valuable objects such as lamps and statues to a table or the like, in which case the device may be hidden from view by an apron or skirt surrounding same.

BRIEF DESCRIPTION OF DRAWINGS

Further features and advantages of the invention will become more readily apparent from the following description of preferred embodiments as illustrated by way of examples in the appended drawings, in which:

FIG. 1 is an exploded view of a device according to the invention showing how it may be used for securely connecting a portable piece of equipment to a support;

FIG. 2 is an enlarged fragmentary perspective view of the device shown in FIG. 1; and FIGS. 3 and 4 are end elevation views of other preferred embodiments according to the invention.

DESCRIPTION OF PREFERRED EMBODIMENTS

Referring first to FIGS. 1 and 2, there is shown an anti-theft device generally designated by reference numeral 10 for securely connecting a piece of portable equipment, such as a micro-computer monitor 12, to a desk 14 or other like support. Two such devices 10 are used, one adjacent each side of the monitor 12.

Each device 10 comprises a pair of identical members 16 which are elongated and U-shaped in cross-section. The member 16 is formed with two spaced-apart parallel arms 18 and 18' and a planar base 20 interconnecting the arms 18 and 18', the arms extending at right angle to the base 20. A cushioned adhesive material 22 extends over substantially the full length of the planar base 20 and defines an adhesive securing surface 24 for adhesion to the base of the monitor 12 or the upper surface of the desk 14. A peel-off protective tape 26 normally covers the adhesive material 22 and is peelable to expose the adhesive securing surface 24 for adhesion to the monitor 12 or desk 14. As example of suitable cushioned adhesive material 22, use can be made of the material sold under the trade mark SCOTCH, product No. 4945, by 3M Canada Inc.

As shown, the members 16 are adapted to be coupled together by tamper-proof screws 28 and positioned between the monitor 12 and desk 14 so that one member may be adhesively secured to the monitor 12 and the other member to the desk 14. The members 16 are coupled together in a manner such that each member has a respective arm 18 interposed between the respective arms 18 and 18' of another member; this permits lateral adjustment of the members 16 relative to one another so that precise alignment of the members is not needed for interconnection. Thus, the monitor 12 may be readily secured to the desk 14 by first peeling-off the protective tape 26 from the adhesive material 22 of each member 16 to expose the adhesive securing surface 24, then adhesively securing one member to the monitor 12 and another member to the desk 14, and thereafter coupling the members 16 together in the manner just described with the screws 28 engaging in aligned openings 30 formed in the arms 18 and 18' of the members 16. The screws 28 are tamper-proof in that they have specially designed heads 32 requiring a special tool for the retrieval of the screws, which tool is possessed by an authorized person only.

When an authorized person desires to remove the monitor 12 from the desk 14, as for re-locating or for servicing the same, he need but retrieve the screws 28 from the openings 30 to allow the members 16 to be disengaged from one another. If necessary, the members 16 can also be removed from the base of the monitor 12 and the upper surface of the desk 14 by applying a solvent such as acetone or lighter fuel to weaken the adhesive bond of the material 22 all around the member 16 and then prying the latter away from the base of the monitor or the upper surface of the desk. As a result, both the base of the monitor 12 and the upper surface of the desk 14 will be left intact, with no damage thereto.

The device 100 shown in FIG. 3 is essentially similar to the device 10 illustrated in FIGS. 1 and 2, and comprises two elongated members 102 and 104 of U-shaped cross-section. The member 102 is formed with two spaced-apart parallel arms 106 and 106' and a planar base 108 interconnecting the arms 106 and 106' whereas the member 104 is formed with two spacedapart parallel arms 110 and 110' and a planar base 112 interconnecting the arms 110 and 110'. Both members 102 and 104 are coupled together by means of tamper-proof screws 28' similar to the screws 28 previously mentioned but of shorter length, the planar bases 108 and 112 being similarly provided with cushioned adhesive material 22. However, as opposed to the embodiment shown in FIGS. 1 and 2, the space defined between the arms 106 and 106' of member 102 is larger than the space defined between the arms 110 and 110' of member 104 so that upon coupling the member 102 straddles the member 104. Since the planar bases 108 and 112 are considerably larger than the base 20 of the member 16 illustrated in FIG. 2, the device 100 is particularly suited for securing non heat-generating equipment having a relatively narrow base such as a telephone 12' to the desk 14 and, as shown, only one such device 100 is required. Valuable objects such as lamps and statues can also be secured to a table or the like with the device 100.

Turning to FIG. 4 which shows another embodiment according to the invention, the device 200 illustrated is seen to comprise two identical members 202 which are elongated and T-shaped in cross-section. Each member 202 is formed with a planar base 204 and an arm 206 extending at right angle to the planar base 204, the base being provided with cushioned adhesive material 22 extending over substantially the full length of the base as in the embodiment illustrated in FIGS. 1 and 2. As shown, the members 202 are coupled together by tamper-proof screws 28' extending through the arms 206, the members 202 defining in their coupled position an H-configuration.

The members 16, 102, 104 and 202 are preferably made of metal such as aluminum, but can also be made of rigid molded plastic material.

As it is apparent, the devices 10, 100 and 200 are of simple and economical construction and their installation is easy and does not require perforating either the base of the monitor 12 or the top of the desk 14; their removal will leave both the monitor and desk undamaged. Moreover, it will be appreciated that the anti-theft devices 10 and 200 owing to their structure do not necessarily need a complete large flat surface to install, i.e, they can be supported on a frame. They also present minimum obstruction between the piece of equipent and support surface and will thus allow proper ventilation or air circulation underneath the piece of equipment being secured, where such ventilation becomes essential in the case of equipment generating heat.

I claim:

1. An anti-theft device in combination with a portable object retained by said device against removal from a support, said device being interposed between said object and support and comprising a pair of members each formed with an attachment base having an adhesive securing surface facing one direction and with at least one connecting arm prohecting from said base in an opposite direction, said members interconnecting said object and said support through said connecting arms with one member having its attachment base adhesively secured to said object and the other member having its attachment base adhesively secured to said support, said connecting arms extending in side-by-side relationship, and tamper-proof fastening means coupling together said connection arms to thereby securely connect said object to said support while supporting said object in spaced-apart relationship from said support.

2. A combination according to claim 1, wherein each said member is provided with a cushioned adhesive material defining said adhesive securing surface.

3. A combination according to claim 2, wherein said adhesive securing surface is normally covered by a peel-off protective tape when said device is not installed.

4. A combination according to claim 3, wherein each said member is elogated and has a U-shaped cross-section with two spaced-apart parallel arms and a planar base interconnecting said arms, and wherein said adhesive material extends over substantially the full length of said planar base.

5. A combination according to claim 4, wherein the space defined between the arms of said one member is larger than the space defined between the arms of said other member so that when said members are coupled said one member straddles said other member.

6. A combination according to claim 4, wherein the arms of each said member extend at right angle to the base thereof.

7. A combination according to claim 3, wherein each said member is elongated and has a T-shaped cross-section with a planar base and an arm extending at right angle to said planar base, and wherein said adhesive material extends over substantially the full length of said planar base.

8. A combination according to claim 7, wherein said tamper-proof fastening means comprise tamperproof screws engageable in aligned openings formed in the arms of said members, said members when coupled together defining an H-configuration.

9. An anti-theft device in combination with a portable object retained by said device against removal from a support, said device comprising a pair of identical, elongated members of U-shaped cross-section each formed with two spaced-apart parallel arms and a planar base interconnecting said arms, said base being provided with a cushioned adhesive material extending over substantially the full length of the base to define an adhesive securing surface of the type normally covered by a peel-off protective tape which is peelable to exppse said adhesive securing surface for adhesion to said object or said support, said members interconnecting said object and said support through said arms with one member having its base adhesively secured to said object and the other member having its base adhesively secured to said support, said arms extending in side-by-side relationship such that each member has a respective arm interposed between the respective arms of another member, and tamper-proof fastening means coupling the arms of said members to thereby securely connect said object to said support.

10. A combination according to claim 9, wherein said tamper-proof fastening means comprise tamper-proof screws engageable in aligned openings formed in the respective arms of said members.

* * * * *